INFORMATION TRANSLATING SYSTEM
Filed May 26, 1955
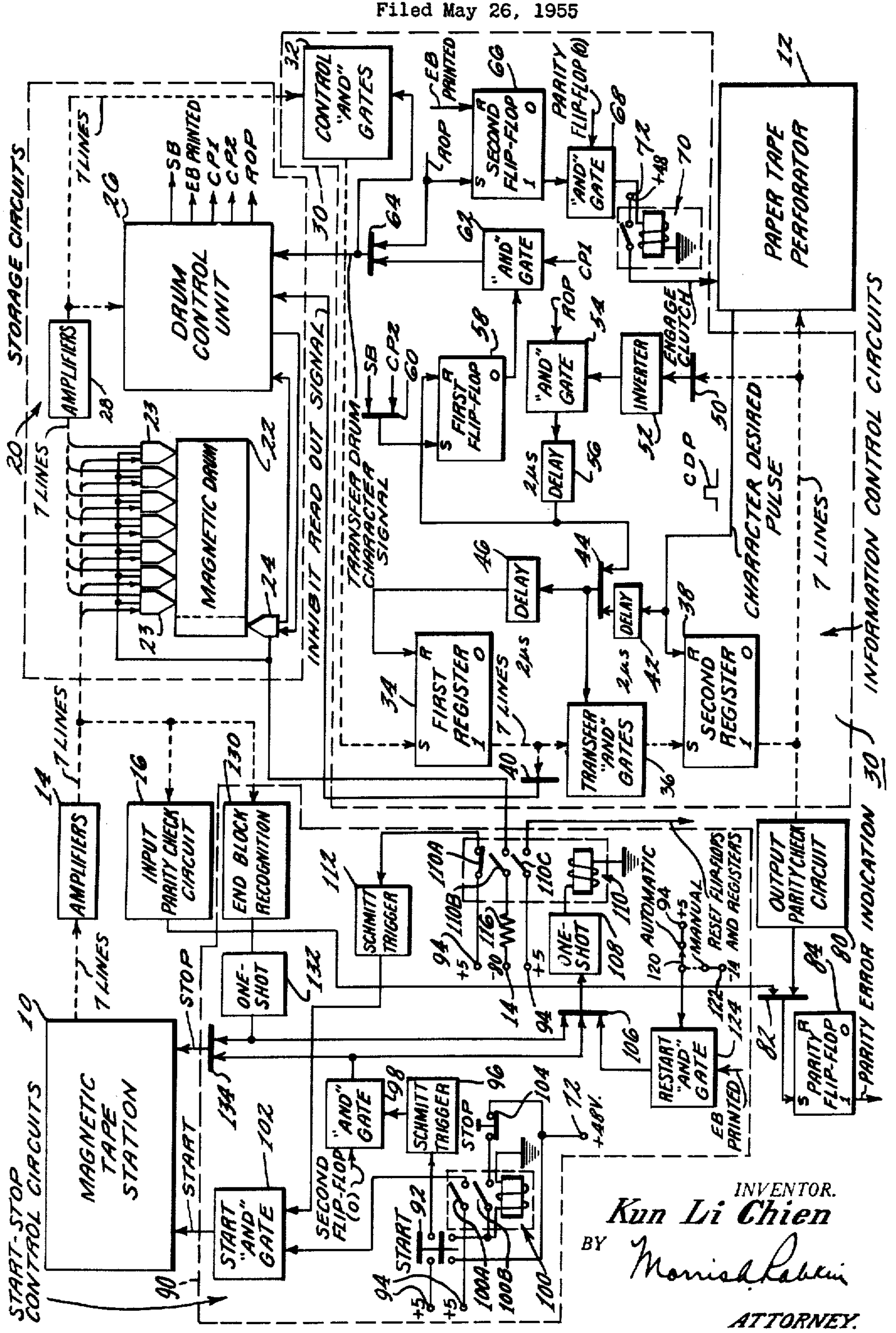
INVENTOR.
Kun Li Chien
BY Morris A. Rabkin
ATTORNEY.

United States Patent Office 2,911,625

Patented Nov. 3, 1959

2,911,625

INFORMATION TRANSLATING SYSTEM

Kun Li Chien, Erlton, N.J., assignor to Radio Corporation of America, a corporation of Delaware Application May 26, 1955, Serial No. 511,155

15 Claims. (Cl. 340—174)

This invention relates to a system for translating information between media which operate at different speeds.

To properly and fully use both high-speed and low-speed methods of representing data, some economical device of translating information from one speed to a lower speed form is desirable. Information should be rapidly and reliably translated from one medium to the other, simply and economically. For example, information may be encoded on cards in the form of perforation patterns and on magnetic tape in the form of magnetized spot patterns. Magnetic tape has the particular advantage that information may be densely packed and rapidly handled when stored thereon. Furthermore, magnetic tapes may be erased and used repeatedly in information sorting and collating processes. Perforated records, on the other hand, such as perforated paper tape, are simply, economically made, and supply a permanent record at low cost, but are handled at a lower speed.

It is therefore an object of this invention to provide an improved device for translating information between media operating at different speeds, which device is characterized by simplicity and economy.

A further object of this invention is to provide an improved system for translating data from one medium to a relatively lower-speed medium, said system operating more accurately and rapidly than the systems of the prior art.

Another object of this invention is to provide an improved system for translating information from a magnetic tape to a perforated paper tape more rapidly and efficiently than the systems heretofore known.

Yet another object of this invention is to provide an improved system for translating blocks of information recorded on a magnetic tape to corresponding blocks of information recorded on a perforated paper tape, which system is characterized by accuracy of translation, reliability of operation, and simplicity of design.

A translating device provided in accordance with the invention may translate information from an input device to a slower speed output device. A block of information is read from the input device and placed, during reading, on a magnetic drum. Information from the block of information on the drum is provided, one or two characters at a time, to character registers which temporarily store the characters. These temporarily stored characters are then fed from the registers to an output device. The timing is arranged so that the output device operates at its maximum speed during the translation of the block of information. At various points in the translation process the information may be checked for errors, and a character having an error is indicated.

The novel features of the invention, as well as the invention itself, both as to its organization and method of operation, will best be understood from the following description, when read in connection with the accompanying drawing, the sole figure of which is a block diagram of one arrangement which may be employed in practicing the invention.

Referring to the figure, a system in accordance with the invention may employ a magnetic tape station 10 as the input device, and a paper tape perforator 12 as the output device. Information recorded in magnetized spot patterns on magnetic tape is to be derived from a magnetic tape and recorded as perforation patterns on paper tape. Information may be packed at approximately 100 binary-coded decimal characters per inch on magnetic tape. Further, magnetic tape may be read at a rate of approximately 100 inches (or 10,000 characters) per second. Information on paper tape, on the other hand, may be packed at approximately 10 characters per inch at a perforation rate of from 10 to 30 characters per second. The packing densities and rates of operation given are typical figures only, because different machines and different standards may be chosen.

A magnetic tape station 10, when used for providing coded information, may have a plurality of output channels and start and stop inputs. A seven binary-digit code is assumed here for purposes of illustration. Accordingly, the magnetic tape station 10 has seven output lines in parallel. The outputs from the magnetic tape station 10 are directed through amplifiers 14 to magnetic drum circuits 20, an input parity check circuit 16, and start-stop control circuits.

A parity check circuit, such as the input parity check circuit 16, provides a means of checking the coded information. In accordance with a known parity scheme, one channel of the seven available may be employed to make the sum of the binary ones in each character even. The parity check circuit 16 checks each character to determine if the parity is correct, and provides an output signal if the count is not correct. An odd parity scheme, in which the sum of the binary ones in each character is odd, may be used as an alternative.

Information derived from the magnetic tape station 10 is also directed to storage circuits 20. The storage circuits 20 include a magnetic drum 22 having different recording-reproducing (that is, write-read) heads 23 coupled to the amplifiers 14. Also arranged with the magnetic drum 22 is a control track recording-reproducing head 24. The various heads 23, 24 are also coupled through amplifiers 28 to circuits here designated as a drum control unit 26. In addition, an erase control signal is coupled to each of the read-write heads 23, 24, which functions to control the drum 22 to erase information therefrom. Signals applied to the drum control unit 26 are used for purposes of controlling information access to or information egress from the drum. The drum control unit 26 selects characters from the drum 22, as by a counter arrangement (not shown) operating with the control track head 24, upon demand of a transfer drum character signal. The drum control unit 26 provides a pair of timed clock pulses CP1 and CP2 for each character. In the absence of an inhibit read out signal, the drum control unit 26 also provides a read out pulse (ROP) coincident with CP2 for each character to be read from the drum 22. The derivation of the "inhibit read out" signal is described below. On beginning the reading of a block of information from the drum, the drum control unit 26 provides a start block (SB) signal. On completion of the read out from the drum of the last character in a block the drum control unit 26 provides an end block printed (EB printed) signal.

Storage circuits capable of transferring characters, in sequence, out of a magnetic drum are known. However, one such character transferring system which may be employed to advantage for the storage circuits 20 is described in a copending application entitled "Serial Memory System," filed August 2, 1954, Serial No.

447,162, now Patent No. 2,817,072, issued December 17, 1957, by Kun Li Chien and Charles H. Propster, Jr. Referring to this latter mentioned application, the start block signal SB from the drum control unit 26 of the subject application is obtained from the output of gate 62 in the Chien-Propster application. Similarly, the clock pulses CP1 and CP2 are derived from the clock pulse generator 52 of that application. Within the clock pulse generator 52 a one shot multivibrator 56 produces the first clock pulse CP1 when it receives a pulse from the "or" gate 54. The clock pulse CP1 is applied to a delay line 58, the output of which is a second clock pulse CP2 occurring a delay time D after CP1. Similarly, in the Chien-Propster application, the read information channels are applied to a start message recognition circuit 60, the output of which, along with CP1, provide the inputs to gate 62 to produce the start block signal SB mentioned above. The read out pulse ROP, for the subject invention, is provided by the output waveform 102 from the one shot multivibrator 56 shown in the Chien-Propster application. The transferred drum character input signal to the drum control unit 26 is coupled as shown in the Chien-Propster application, to one of the inputs to gate 78 (that input which is connected to the output of the one shot multivibrator 76). The inhibit read out signal input to the drum control unit 26 is not shown in the Chien-Propster application, but may be an inhibit input connected to the gate 64. Similarly, the input and outputs connecting the read-write head 24 to the drum control unit 26 corresponding to the connections between the read-write head 26 and the control pulse write amplifier 80 and the control pulse read amplifier and pulse shaper 74 of the Chien-Propster application.

As described in the Chien-Propster invention, a cyclic memory such as a continuously rotating magnetic drum is employed for receiving the informaiton from the higher speed device and transferring the information at a lower speed to the other devices. A plurality of parallel channels on the drum magnetically store the information signals serially around the drum. Another parallel channel is employed for storing control signals that control the sequence of read out. A control signal is written in the control channel each time a line of information is read out to the output device. The presence of the control signal in the channel indicates that the corresponding line of information has been previously read out. The control signal is employed to inhibit the read out of a corresponding information line a second time. When the read out of an information line is inhibited, the next information line, not having a corresponding inhibit control signal, is then read out. Thus the information is in the proper sequence when read out upon demand.

Thus the speed conversion device is one which is capable of furnishing sequential characters of a message on demand along with clock pulses and read out pulses corresponding to the character locations, and an end block of characters signal.

Referring again to the sole figure in the present application, outputs are provided from the group of amplifiers 28 in the storage circuits 20 to a group of information control circuits 30. The seven signal channels from the amplifiers 28 are directed through a group of control "and" gates 32 to a first flip-flop register 34. Suitable "and" gates units are known in the computing and information handling arts. Suitable registers are also known in these arts. An "and," or coincidence gate, for example, has a plurality of inputs and provides an output only when enabling signals are present on all its inputs. A register, such as a flip-flop register, may have a different bistable element for each digital position of a binary expression to be register or stored. The states, here set (S) or reset (R), of the various bistable elemnets, or flip-flops, when taken together provide the desired binary expression.

Registers and flip-flops herein may be reset to a binary zero value.

The outputs from "one" terminals of the first flip-flop register 34 (designated "1") represent binary digits of information. Each "one" output is at an enabling (high) level when its flip-flop is set, and at a non-enabling (low) level when its flip-flop is reset. These binary "one" outputs are directed through a group of transfer "and" gates 36 to the set inputs of a second flip-flop register 38. The binary one outputs of the second flip-flop register 38 are coupled to the information signal inputs of the paper tape perforator 12. The binary one outputs of the first flip-flop register 34 are also coupled, through an "or" circuit 40 to the drum control unit 26. An "or" circuit has a plurality of inputs and provides an output when any one or more of its inputs is activated to an enabling level by a signal.

A paper tape perforator, such as the perforator 12, may operate in timed cycles in response to information and clutch control signals. When an "engage clutch" signal is provided to the perforator 12, it perforates the paper tape with the applied signal combination. The perforator 12 also provides, after each perforation, a "character desired pulse" CDP when it is ready to receive another character signal for the next perforation. The "engage clutch" signal may be provided continuously, to operate the perforator 12 as rapidly as possible.

Character desired pulses are directed from the paper tape perforator 12 to the reset input of the second flip-flop register 38 and also to a 2 μsec. (two microsecond) delay line 42. Each character desired pulse CDP is delayed sufficiently in the 2 μsec. delay line 42 to permit the second flip-flop register 38 to be fully reset. The character desired pulse CDP then activates the transfer "and" gates 36 through an "or" circuit 44. The output of the "or" circuit 44 is also delayed in a 2 μsec. delay line 46 and applied to the reset input of the first flip-flop register 34.

The binary one outputs of the second flip-flop register 38 are coupled to an "or" circuit 50. The output of the "or" circuit 50 is coupled, through an inverter 52, to one input of a two-input "and" gate 54. The remaining input of the "and" gate 54 is activated by ROP signals from the drum control unit 26. The output of the "and" gate 54 is applied, through a 2 μsec. delay line 56, to the reset input R of a first flip-flop 58, and to an input of that "or" circuit 44, the output of which is coupled to the transfer "and" gates 36. Signals applied to the set input S of the first flip-flop 58 are derived from an "or" circuit 60 activated by the start block SB or the second block pulse CP2 signals from the drum control unit 26. The binary zero output of the first flip-flop 58 activates or "primes" one input of a second two-input "and" gate 62. The other input of the "and" gate 62 is activated by the first clock pulse CP1 from the drum control unit 26. The output of the "and" gate 62 is directed through an "or" circuit 64 to the control "and" gates 32 and to the drum control unit 26. The output of the "or" circuit 64 primes the control "and" gates 32, to transfer a character read from the drum 22 through the amplifiers 28 to the first flip-flop register 34. The output of the "or" circuit 64 is called the "transfer drum character" signal.

ROP signals are applied to the "or" circuit 64, and also to the set input of a second flip-flop 66. The second flip-flop 66 is reset by EB printed signals. The binary one output of the second flip-flop 66 primes one input of a two-input "and" gate 68, the other input of which is the binary zero output of a parity error flip-flop to be described. Outputs from the "and" gate 68 energize the coil of a relay 70. When the relay 70 is energized the relay arm completes a circuit between a +48 volt supply and the paper tape perforator 12. The signal thus provided when relay 70 is energized is the "engage clutch" signal for the paper tape perforator 12.

An output parity check circuit 80 is provided which receives and is responsive to the binary one outputs of the second flip-flop register 38. The output parity check circuit 80 and the input parity check circuit 16 outputs are applied to a two-input "or" circuit 82, the output of which is applied to the set terminal S of a parity flip-flop 84. An enabling (or high) level at the parity flip-flop 84 binary one output signals the occurrence of a detected error, and the signal may be employed to stop the magnetic tape station 10 and the paper tape perforator 12.

Various other units are shown in a group called the start-stop control circuits 90. A start push button relay 92, when energized, couples a +5 volt supply 94 to the input of a Schmitt trigger circuit 96. The Schmitt trigger here employed, when actuated by a pulse or a steady state signal, provides a single output pulse of predetermined duration. The output of the Schmitt trigger 96 is applied to one input of a two-input "and" gate 98. The remaining input of the "and" gate 98 is coupled to the binary zero output of the second flip-flop 66.

The start push button relay 92, when energized, also couples the coil of a relay 100 to the +48 volt source 72. When the relay 100 is energized through the circuit comprising the +48 volt supply 72, the start push button 92, and the common conductor, the two arms 100A and 100B of the relay 100 close. The first arm 100A completes a circuit between the +5 volt supply 94 and one input of a two-input "start" "and" gate 102. The second arm 100B completes a locking (that is, holding) circuit between the common conductor, the coil of the relay 100, a stop push button 104, and the +48 volt supply 72.

The output of the "and" gate 98 is applied to one input of a three-input "or" circuit 106. The output of the three-input "or" circuit 106 is applied to the input of a one-shot multivibrator 108. The one-shot multivibrator provides an output pulse of predetermined amplitude and duration in response to an input pulse. The output of the one-shot multivibrator 108 energizes a relay 110 having first, second, and third relay arms 110A, 110B, and 110C respectively. In the drawing, all relay arms are shown in their normal position, i.e., the position occupied when the associated relay is de-energized. Relay arm 110A is normally closed, and relay arms 110B and 110C are normally open.

The first relay arm 110A, when closed, couples the +5 volt supply 94 to the input of a Schmitt trigger 112. The output of the Schmitt trigger 112 is coupled to the second input of the start "and" gate 102. The second arm 110B, when closed, completes a serial circuit, comprising a −80 volt supply 114, a resistor 116, to provide an erase signal for the recording and reproducing heads 23, 24. The third relay arm 110C, when closed, completes a circuit from the +5 volt supply 94 to the reset input of each flip-flop and each flip-flop register shown in the drawing. For simplicity in the drawing, the connection to reset inputs from relay arm 110C is indicated, but not completely shown.

A manually operable switch 120 is employed to control automatic restarting of the system. The switch 120 has two contacts, a first of which is designated as the "manual" contact, and a second of which is designated as the "automatic" contact. When set to the manual contact, switch 120 couples a −14 volt supply 122, to one input of a two-input restart "and" gate 124. When set to the automatic contact, switch 120, couples one input of the restart "and" gate 124 to the +5 volt supply 94. The other input of the restart "and" gate 124 is coupled to the EB printed signals from the drum control unit 26. The ouput of the restart "and" gate 124 provides one of the inputs to the "or" circuit 106.

The start-stop control circuits 90 also include an end block recognition circuit 130 connected to receive signals in the seven channels from the input amplifiers 14. The end block recognition circuit 130 may be any of several forms. One such form, for example, may detect the occurrence of a distinctive character or signal at the termination of a block of information. In the alternative, circuit 130 may be a counter circuit, to count a predetermined number of characters to provide an output. Or the circuit 130 may detect the occurrence, on the input magnetic tape, of a blank space greater than a predetermined length. For purposes of illustration, a circuit of this last mentioned circuit is assumed for the circuit 130. It is further assumed that the characters are grouped into blocks on the magnetic tape with a predetermined spacing between the blocks.

The output of the end block recognition circuit 130 is directed to a one-shot multivibrator 132, which provides output signals to a two-input "or" circuit 134 and to the remaining input to "or" circuit 106. The remaining input of "or" circuit 134 receives signals from "and" gate 98. Outputs from "or" circuit 134 comprise "stop" signals for the magnetic tape station 10.

The various time and signal values which are shown are only by way of example of one arrangement which may be employed. Further, conventional ground symbols have been generally omitted for clarity.

The operation is described for control of the reproduction by a paper tape perforator 12 of blocks of characters, derived from a magnetic tape station 10. For simplicity, the blocks of characters (information) are assumed not to exceed a given maximum number so that the drum 22 may be of predetermined size. By well known methods, the drum 22 size and speed may be so selected that a given block of characters may be placed in a train without overlapping on the drum 22.

To start the operation, the start push button 92 is depressed. Momentary manual closure of the start push button 92 completes a circuit between the +5 volt supply 94 and the Schmitt trigger 96. The Schmitt trigger 96 provides a single output pulse of predetermined duration, thereby priming "and" gate 98. The remaining input of the "and" gate 98 is at this point in time primed by the zero ouput of the second flip-flop 66. The second flip-flop 66 is in its reset state following the completion of transfer of the last previous block of information, as described below. The "and" gate 98 therefore provides an output signal through "or" circuit 106 and "or" circuit 134. "Or" circuit 134 provides a stop signal to the magnetic tape station 10. The output of "or" circuit 106 activates the one-shot multivibrator 108, to provide a pulse which, for purposes of illustration, may be .15 second duration. This .15 second pulse energizes relay 110, thereby breaking the circuit of relay arm 110A, and closing the circuits of relay arms 110B and 110C.

While relay contact 110B is closed, the erase signal is provided from the −80 volt supply 114 through the resistor 116 and second relay arm 110B to the drum heads 23, 24. Previously stored patterns on the drum 22 are therefore erased. Further, a reset signal is applied to all flip-flops and flip-flop registers through the third relay arm 110C from the +5 volt supply 94. Finally, "and" gate 102 is disabled during this period while the circuit through relay 110A to the Schmitt trigger 112 is broken.

Actuation of the start push button 92 also makes a locking circuit to lock in the relay 100. Thus when the second arm 100B of the relay 100 closes, a circuit through the +48 volt supply 72, the stop push button 104, the winding of relay 100, and the ground connection is completed. The relay 100 is held locked-in until the stop push button 104 is actuated. The first arm 100A of the relay 100 primes the start "and" gate 102 from the +5 volt supply 94.

Upon termination of the pulse from one-shot multivibrator 108, relay 110 is de-energized, and the first relay arm 110A returns to its normally closed position. Therefore the coupled Schmitt trigger 112 is energized from the +5 volt supply 94 through the first relay arm 110A. The Schmitt trigger 112 provides a single pulse output, fully activating the already primed start "and"

gate 102 to provide the start signal to the magnetic tape station 10.

Assume here that the transfer of information is to be automatic, that is, that successive blocks of information are to be transferred without the need of manual switching operations. The switch 120 is therefore placed at the "automatic" contact, priming the restart "and" gate 124 from the +5 volt supply 94.

Application of the start signal to the magnetic tape station 10 causes the reading of the tape in the station. Because of the speed of operation of modern magnetic signal reproducing equipment and tape transport equipment, a large block of characters (say a maximum of 512) may be reproduced in a short time after application of the start signal. These characters are provided in succession to the information channel heads 23 on the magnetic drum 22, and recorded in a series in less than one revolution of the drum 22. Upon termination of the block of characters, the end block recognition circuit 130 detects the blank space between the block just read and the next succeeding block. The end block recognition circuit 130 provides an output which activates the coupled one-shot multivibrator 132. One-shot multivibrator 132 provides an output pulse, of predetermined duration through the "or" circuit 134 to the stop input of the magnetic tape station 10. The tape is therefore stopped and it is not started again until the previous block of information has been entered into the paper tape perforator 12.

The entire block of characters on the drum 22 is provided in time sequence from the recording-reproducing heads 23 to the drum control unit 26 once in each revolution. The drum control unit 26 selects the next character or characters to be read during successive revolutions of the drum 22. The drum control unit 26 provides a start block signal SB on each reading of the first character of a block and a pair of clock (timing) pulses CP1 and CP2 for each character in the block. These clock pulses may each be one microsecond in duration separated by a three microsecond delay. There may be provided at approximately the central point in the time duration of pulses from reading heads 23 representing the characters. The character pulses, reproduced from the drum 22, may themselves be some 25 microseconds in duration. When the character provided from the drum 22 is the next character to be transferred out, the second clock pulse CP2 is accompanied by a read out pulse ROP. ROP is provided unless an inhibit read out signal is also present.

The series of characters reproduced in each revolution of the drum 22 and applied to the drum control unit 26 is also applied to the control "and" gates 32. Either one or two of the characters, however, are transferred in each revolution through the control "and" gates 32 into the first flip-flop register 34.

Following recording of a block of characters on the drum 22, no signals are provided from the drum control unit 26 until the drum 22 rotates around to the start of the block. Under these conditions, "or" circuit 40, being responsive to the binary one outputs from the first register 34 which is reset, provides no inhibit read out signal. Further, with "and" gate 68 disabled, relay 70 is disabled and no engage clutch signal is provided to the paper tape perforator 12. The second flip-flop register 38 is in a binary zero state. "Or" circuit 50, coupled to the one output of the second register 38, provides a low potential output so that the inverter 52 provides a high level output. "And" gate 54 is therefore primed at this point in time. A character desired pulse CDP is not provided from the perforator 12 until the clutch is engaged.

When the first character of the block passes under the heads 23, following completion of recording, the heads 23 reproduce the signal pattern. The first character denotes the start of the block, and the SB signal is provided.

The SB signal sets the first flip-flop 58, and is followed in time (*a*) by the first clock pulse CP1 and then (*b*) by the coincident second clock pulse CP2 and the read out pulse ROP. Because the first flip-flop 58 is set, however, the coupled "and" gate 62 is not primed and consequently does not provide a transfer drum character signal through "or" circuit 64 at the first clock pulse CP1. Coincident with the second clock pulse CP2, however, the read out pulse ROP is applied through "or" circuit 64 to provide the transfer drum character signal to the control "and" gates 32. The control "and" gates, now primed in a pattern dependent upon the character being read from the drum, provide outputs to set the first flip-flop register 34. The first flip-flop register 34 therefore temporarily stores, or "statisizes," the character transferred from the drum 22. At least one binary one output from the first flip-flop register 34 is high, so that "or" circuit 40 provides an inhibit read out signal to the drum control unit 26. The transfer drum character signal is applied to the drum control unit 26 to operate the addressing arrangement of the unit 26 to select the next character.

The start block signal SB sets the first flip-flop 58 through "or" circuit 60. The first flip-flop 58 is reset shortly after the read out pulse ROP, however. The read out pulse ROP activates the previously primed "and" gate 54, which provides an output to the coupled delay line 56. The delay allows sufficient time for the first flip-flop 58 and the first flip-flop register 34 to become quiescent after receiving the applied signals. The output pulse from the delay 56 then resets the first flip-flop 58 and activates the transfer "and" gates 36 through the "or" circuit 44. Those transfer "and" gates 36 which are primed by binary one outputs of the first flip-flop register 34, being fully activated, transfer signals to corresponding inputs of the second flip-flop register 38. Thus the second flip-flop register 38 staticizes the first character provided from the drum 22. This first character is available to the perforator 12 for control in making the first perforation pattern.

The undelayed read out pulse ROP also sets the second flip-flop 66, fully activating the "and" gate 68 coupled thereto. The remaining input of the "and" gate 68 is primed by zero outputs of the parity flip-flop 84. The "and" gate 68 output energizes the relay 70, closing the relay 70 which provides the engage clutch signal from the +48 volt supply 72 to the paper tape perforator 12.

Because the second register 38 holds the first character from the drum 22 following the delayed read out pulse ROP, the first register 34 may receive a new character. Accordingly, the output of the "or" circuit 44 is first retarded in a delay line 46 sufficiently to permit the transfer "and" gates 36 to complete their operation, and is then applied to the reset input of the first register 34. Note that the entire action of transferring the first character from the drum 22 to the first flip-flop register 34 and then to the second flip-flop register 38 takes place during the time the first character is being reproduced. No time conflict appears, because, for example, in a typical case, the drum character may have a time duration of 25 microseconds while the clock pulses and delay periods are only one or two microseconds.

The time required for the paper tape perforator 12 to use the character provided by the second flip-flop register 38 may vary. As is shown below, however, the second flip-flop register 38 holds the character without change until a new character is demanded, by a character desired pulse CDP from the perforator 12.

Assume that the character desired pulse CDP is not provided until after the next (second) character is available from the drum 22. At the beginning of the reproduction of this second character the inhibit read out signal is not provided. Further, "and" gate 54 coupled to the second flip-flop register 38 is disabled. "And" gate 62 is primed, however, because of the previous resetting of the first flip-flop 58, and provides an output on the first clock pulse CP1. "Or" circuit 64, upon the advent of first clock pulse CP1 for the second character, thus provides the transfer drum character signal to the drum control unit 26 and the control "and" gates 32. Therefore, during the reading of the second character from the drum 22, the signal combination applied to the control "and" gates 32 is transferred on the first clock pulse CP1 to the first flip-flop register 34. At the completion of reading of the second character, therefore, the first character is staticized by the second flip-flop register 38 and the second character is staticized by the first flip-flop register 34. The setting of the second signal combination into the first flip-flop register 34 activates the coupled "or" circuit 40, applying the inhibit read out signal to the drum control unit 26. The drum control unit 26 therefore does not provide a read out pulse ROP during the second clock pulse CP2 signal for this same second character. Consequently, the first flip-flop 58 is set but not reset during the reading of the character.

The transfer drum character signal is used in the drum control unit 26 to select the address of the next (third) character to be read out. All characters reproduced from the drum 22 during the first revolution following transfer of the first two characters provide first and second clock pulses CP1 and CP2 from the drum control unit 26. No read out pulses ROP are provided, however, until the third character is reproduced on the next revolution. Likewise no transfer drum character signals are provided, because "and" gate 62 is disabled until following the next read out pulse ROP. Thus the first two characters are staticized by the flip-flop registers 34, 38 until information is demanded by the perforator 12.

If no information is demanded by the perforator 12 and no character desired pulse CDP is applied, the registers 34, 38 are not affected. Consequently, the inhibit read out signal applied to the drum control unit 26 prevents the read out pulse ROP on the next revolution of the drum 22, and for subsequent revolutions as long as the inhibit read out signal is present. Assume, however, that a character desired pulse CDP is provided from the perforator 12 sometime between the transfer of the second character and the reproduction of the third character on the next subsequent revolution of drum 22. Character desired pulse CDP signifies that the character combination provided by the second flip-flop register 38 has been utilized by the perforator 12, and that a new character may be provided.

The character desired pulse CDP resets the second flip-flop register 38, enabling it to receive and staticize a new character. After a short delay in delay line 42, sufficient to insure complete reset of the second flip-flop register 38, the character desired pulse CDP activates the transfer "and" gates 36. Thus, the second character combination, previously held in the first flip-flop register 34, is set into the second flip-flop register 38. The second character is thus promptly made available to the perforator 12, although the first flip-flop register 34 at this point in time is reset by the output of "or" circuit 44, delayed in delay line 46 to permit transfer of the second character. Thus the first flip-flop register 34 is prepared to receive a new (here, the third) character.

Dependent upon the times of operation of the perforator 12 with respect to the revolutions of the drum 22, either one or two characters may be transferred into the first flip-flop register 34 during each drum 22 revolution. Thus if not new character desired pulse CDP is provided in the present example by the perforator 12 until after the third character is reproduced on the second revolution of the drum 22, only the third character will be transferred into the first flip-flop register 34. Each character from the drum 22 is by-passed until the read out pulse ROP is provided in response to the third character. The read out pulse ROP activates the "or" circuit 64, providing the transfer drum character signal to activate the control "and" gates 32 and to advance the addressing portion of the drum control unit 26. The third character is set into and staticized by the first flip-flop register 34, and the drum control unit 26 selects the fourth character for read out. The read out pulse ROP is inhibited, however, because of the inhibit read out signal applied from "or" circuit 40. Note that in this instance the contents of the second flip-flop register 38 prevent the delivery of the next subsequent (fourth) character in the same drum 22 revolution. At least one of the binary one outputs of the second flip-flop register 38 is at a high level potential because the register 38 staticizes a character. Thus the coupled "or" circuit 50 provides a high level output and the inverter 52 provides a low level signal to the "and" gate 54. The "and" gate 54 is therefore disabled and does not provide an output on the application of the read out pulse ROP. Consequently, no transfer drum character signal occurs until the next read out pulse ROP, which itself does not occur until the inhibit read out signal is removed.

If, in one revolution of the drum 22, the perforator uses the characters from both flip-flop registers 34, 38, two successive characters are transferred from the drum 22. Assume that in the revolution of the drum 22 following the transfer of the third character, the second and third characters are used by the perforator 12. Two character desired pulses CDP are therefore provided successively by the perforator 12, to transfer a character from the first register 34 to the second register 38 and to finally reset both registers 34, 38 in the manner previously described. On the reproduction of the fourth character from the drum 22 on the next revolution there is no inhibit read out signal and a read out pulse ROP occurs. The read out pulse ROP provides the transfer drum character signal to the drum control unit 26 and the control "and" gates 32. The fourth character therefore passes through the control "and" gates 32 into the first register 34. Momentarily, therefore, the fourth character is held in the first register 34 and an inhibit read out signal is applied to the drum control unit 26. However, because the "and" gate 54 is primed (there being no character staticized by the second register 38), the read out pulse ROP provides an output from the "and" gate 54. This output, delayed two microseconds in delay line 56, resets the first flip-flop 58 and also opens transfer "and" gates 36 through "or" circuit 44. The fourth character, staticized by the first register 34, is thus transferred through the transfer "and" gates 36 into the second register 38. The first flip-flop 58, normally impulsed at its set input by each second clock pulse CP2, is reset, thereby providing a zero output to prime "and" gate 62.

After a brief delay by delay line 46 the same signal rests the first register 34, thereby removing the inhibit read out signal from the drum control unit 26. Accordingly, the next character (fifth) may now be used. Note that the transfer of the fourth character from the drum 22 into the second flip-flop register 38 occurs during the reproduction of the fourth character and before the reproduction of the fifth character. A brief existence of the inhibit read out signal, therefore, has no effect on the transfer of the fifth character.

During the reproduction of the next (fifth) character in the block on the drum 22 the drum control unit 26 again provides the timing signals CP1 and CP2. In this situation the transfer of the character is effected by the CP1 signal instead of ROP. Thus CP1 fully activates "and" gate 62, which provides the transfer drum character signal through "or" circuit 64. The fifth character is then passed through the transfer "and" gates 32 into the first flip-flop register 34, and the two registers 34, 38 are again holding characters for the perforator 12.

The general sequence of operation utilizes the much greater speed of the electronic components to fill the registers 34, 38 once during each revolution of drum 22. The "fill" may require one or two characters, but the perforator 12 is not fast enough to demand more than two per revolution. Thus characters are available for the perforator 12, each time the perforator is ready.

On reaching the end of a block, with the selector switch 120 set for automatic operation, the system automatically starts the reading of another block of information from the magnetic tape station 10. The restart "and" gate 124 is primed through the switch 120 from the +5 volt supply 94. Upon the occurrence of the end block signal EB from the drum control unit 26, the restart "and" gate 124 provides a signal through "or" circuit 106 to one-shot 108 thereby energizing relay 110. Relay 110, on being energized, starts a cycle of operation as previously described. If the switch 120 were at the manual position the restart "and" gate 124 would be disabled by the −14 volt source and a manual start signal would have to be provided.

A parity error detected by the input parity check circuit 16 or the output parity check circuit 80 sets the parity flip-flop 84 through "or" circuit 82. The binary one output of the parity flip-flop 84 provides an indication of the error to an operator, or may be used to stop the system. The system may also be stopped at the end of a block of information by operation of the stop push button 104.

Thus there has been described a system for transferring information from one medium operating at a given speed to another medium operating at a lower speed. This system is characterized by its rapidity, simplicity, and economy.

What is claimed is:

1. In a system for translating characters of information from magnetic tape to paper tape, said paper tape having a perforator adapted to receive successive characters, encode said characters on said paper tape, and generate a character desired pulse upon the encoding of each of said characters, the combination comprising storage circuits including a magnetic drum, means to transfer blocks of said characters from said magetic tape to said magnetic drum, a first register coupled to the output of said magnetic drum, a gating means having a first input and a priming input, said first input being coupled to the output of said first register, a second register coupled to the output of said gating means, and means to individually transfer said characters stored by said magnetic drum to said first register, the output of said second register being coupled to the input of said paper tape perforator, said priming input of said gating means being coupled to receive said character desired pulse whereby said characters of information are continuously available to said paper tape perforator.

2. A system for transferring characters of information from a magnetic tape to a paper tape comprising storage circuits, means to transfer groups of said characters of information from said magnetic tape to said storage circuits, a first register, means to transfer said characters individually on demand from said storage circuits to said first register, a second register, a paper tape perforator coupled to the output of said second register, gating means coupling the output of the said first register to the input of the said second register and responsive to signals from said paper tape perforator to pass said characters from said first register to said second register.

3. A system for transferring characters of information from a magnetic tape to an output medium comprising storage circuits, means to transfer groups of said characters of information from said magnetic tape to said storage circuits, a first register adapted to store individual characters of said information, means responsive to the absence of a character in said first register to transfer said characters individually in sequence from said storage circuits to said first register, a second register, said output medium being coupled to the output of said second register, and gating means coupling the output of said first register to the input of said second register and responsive to the absence of a character of information in said second register to pass said characters from said first register to said second register.

4. A system for transferring characters of information from a magnetic tape to a paper tape comprising storage circuits, means to transfer groups of said characters of information from said magnetic tape to said storage circuits, a first register, means including a control gate responsive to the absence of a character in said first register to pass individual sequential characters from said storage circuits to said first register, a second register, a paper tape perforator coupled to the output of said second register, and adapted to encode characters on said tape, said perforator also being adapted to provide a character desired signal upon the encoding of each of said characters, gating means coupling the output of said first register to the input of said second register and responsive alternatively to said character desired signals from said perforator and to the absence of a character of information in said second register to pass said characters from said first register to said second register, whereby characters are always available on demand to said tape perforator.

5. A system for transferring characters of information from a magnetic tape to a paper tape comprising storage circuits, means to transfer groups of said characters of information from said magnetic tape to said storage circuits, said storage circuits including means to read out said characters of information individually and sequentially, said read out means including means providing a read out pulse to indicate the availability of each of said sequential characters, a first register, means including a control gate responsive to said read out pulse and to the absence of a character in said first register to pass said characters, individually, from said storage circuits to said first register, a second register, a perforator coupled to the output of said second register and adapted to encode characters on said paper tape, said perforator being also adapted to provide a character desired signal upon the encoding of each of said characters, gating means coupling the output of said first register to the input of said second register and being responsive alternatively to said character desired signals and to the absence of a character of information in said second register to pass the characters from said first register to the second register, whereby said characters are continuously available to said perforator.

6. The system claimed in claim 5 wherein said control gate means is alternatively responsive to the absence of a character in said second register.

7. An information rate converting system for an input and an output device operating in accordance with different non-synchronous information rates, said output device being adapted to provide a character desired pulse, said converting system comprising a magnetic drum storage system, means for transferring blocks of characters from said input device to said magnetic drum storage system, said drum storage system being adapted to provide a read out pulse signal to indicate the availability of individual sequential ones of said blocks of characters, a first register, a second register, said output device being responsive to said second register, means responsive to either said read out pulse or to the absence of a character in said second register to pass a character from said drum storage system to said first register, and means responsive either to a character desired signal from said output device or to the absence of a character in said second register to transfer a character from said first register to said second register.

8. That system as claimed in claim 7 wherein said last mentioned means includes first means to reset said second register prior to the transfer of said character.

9. That system as claimed in claim 8 wherein said means to transfer a character from said first to said second register includes means to reset said first register subsequent to the transfer of said character.

10. That system as claimed in claim 9 including means responsive to said read out pulse and to the absence of a character in both said first and said second registers to pass a character through said first register to said second register and to reset said first register immediately subsequent to the passage of said character to said second register.

11. A system for transferring characters of information between first and second asynchronously operating storage devices comprising a cyclic storage means, a pair of serially connected registers each adapted to store individual ones of said characters, first means to transfer preselected blocks of said characters between said first storage device and said cyclic storage means, second means to transfer individual ones of said characters between said second storage device and said pair of registers on demand of said second storage device, recognition means coupled to one of said registers to provide an output recognition signal upon the absence of a character in said one register, third means responsive to said recognition signal and to said second storage device to transfer a characted between said registers, and fourth means to transfer characters individually on demand between said cyclic storage means and said pair of registers.

12. A system for transferring characters of information between a paper tape and a magnetic tape comprising storage circuits, means to transfer groups of said characters of information between said magnetic tape and said storage circuits, a first register, means to transfer said characters individually on demand between said storage circuits and said first register, a second register, a paper tape handling device coupled to said second register, gating means coupled between said first register and said second register responsive to signals from said paper tape handling device to pass said characters between each of said registers and between said paper tape handling device and said second register.

13. A system for transferring characters of information between first and second asynchronously operating storage devices, said second device generating character desired signals when available for storage of a said character therein, said system comprising a cyclic storage means, means for transferring preselected blocks each of a plurality of said characters from said first device to said cyclic storage means when the characters in said cyclic storage means have been read out, a first register for storing individual ones of said characters, a gating means for transferring characters individually from said cyclic storage means to said first register, a second register, said second device being coupled to the output of said second register, and gating means coupling the output of said first register to the input of said second register and responsive to said signals to gate characters from said first register to said second register.

14. A system for transferring characters of information from a first storage device to a second storage device, said second device providing character desired signals, said system comprising a bulk storage device, means for transferring groups each of a plurality of said characters from said first device to said bulk storage device, a first register, means for transferring characters individually on demand from said bulk storage device to said first register, a second register connected to be reset by said signals, said second device being coupled to the output of said second register, and gating means coupling the output of said first register to the input of said second register and responsive to said signals to pass said characters from said first register to said second register.

15. A system for transferring characters of information from a first storage device to a second storage device, said second device providing character desired signals when available for storage of a said character therein, said system comprising a bulk storage device, means for transferring groups each of a plurality of said characters from said first device to said bulk storage device, a first register, means for transferring characters individually on demand from said bulk storage device to said first register, a second register, said second device being coupled to the output of said second register, gating means coupling the output of said first register to the input of said second register and responsive to said signals from said second storage device to pass said characters from said first register to said second register, and means for sensing the presence of a character in said first register for providing an inhibit signal, said bulk storage device to first register transferring means being inhibited in response to said inhibit signal to prevent the transfer from said bulk storage device to said first register.

References Cited in the file of this patent

UNITED STATES PATENTS

| | | |
|---|---|---|
| 2,202,392 | May et al. | May 28, 1940 |
| 2,625,607 | Eckert et al. | Jan. 13, 1953 |
| 2,702,380 | Brustman | Feb. 15, 1955 |
| 2,708,267 | Weidenhammer | May 10, 1955 |
| 2,721,990 | McNaney | Oct. 25, 1955 |
| 2,856,595 | Selmer | Oct. 14, 1958 |